United States Patent [19]

Adelsberg et al.

[11] 4,159,353
[45] Jun. 26, 1979

[54] PLATINUM COATING DENSE REFRACTORIES

[75] Inventors: Lee M. Adelsberg, Elmira, N.Y.; Robert Dejaiffe, Aurora, Ill.

[73] Assignee: Corning Glass Works, Corning, N.Y.

[21] Appl. No.: 870,617

[22] Filed: Jan. 19, 1978

[51] Int. Cl.² .................. B05D 1/00; B05D 3/02
[52] U.S. Cl. .................... 427/34; 156/89; 156/279; 156/325; 427/383 B; 427/404; 427/419 R; 427/419 A
[58] Field of Search ............. 427/34, 383 A, 383 B, 427/383 C, 383 D, 419 R, 419 A; 156/279, 89, 325

[56] References Cited

U.S. PATENT DOCUMENTS

| 2,777,254 | 1/1957 | Siefert et al. ............. 156/325 X |
| 3,066,042 | 11/1962 | Ogden ..................... 427/383 C X |
| 3,269,856 | 8/1966 | Jones ......................... 427/34 X |
| 3,410,716 | 11/1968 | Hiltz ............................ 427/34 |
| 3,436,203 | 4/1969 | Wu ............................. 65/374 |
| 3,475,143 | 10/1969 | O'Connor et al. ......... 156/325 X |
| 3,598,635 | 8/1971 | Sagona ................... 427/383 B X |
| 3,627,561 | 12/1971 | Richards ..................... 427/34 |
| 4,024,617 | 5/1977 | McCormick ................ 427/34 X |
| 4,055,451 | 10/1977 | Cockbain et al. ............. 156/89 |

Primary Examiner—Ronald H. Smith
Assistant Examiner—Thurman K. Page
Attorney, Agent, or Firm—Richard N. Wardell; Clarence R. Patty, Jr.

[57] ABSTRACT

The forming of an adherent platinum coating on the surface of hard, highly dense refractories by plasma flame spraying thereon an intermediate layer of a refractory oxide selected from the group comprised of zirconia, zircon, alumina, cordierite, mullite, or zirconia-alumina-silica having a particle size between 140 and 200 mesh, and further plasma sraying thereon a substantially 20–100 micron size platinum powder which is densified by heating to temperatures of 1350°–1600° C.

9 Claims, 5 Drawing Figures

PLATINUM COATING DENSE REFRACTORIES

BACKGROUND OF THE INVENTION

The invention relates to a method by which an adherent platinum coating can be applied to hard, high density refractory substrates.

Various methods of metallically coating refractories have been previously disclosed. See U.S. Pat. No. 3,598,635. In order to achieve bonding of the coating to the substrate it has been necessary to initially roughen the surface of the refractory by grit blasting or chemical etching.

U.S. Pat. No. 3,310,433 discloses a method for coating ceramics of alumina or zirconia by either slip coating with a ceramic layer or grit blasting the ceramic to create a roughened area sufficient to apply by dipping, spraying or painting a molten silver coating saturated in oxygen to the ceramic body.

U.S. Pat. No. 3,436,203 describes a coated refractory for contacting molten glass by lining the refractory with an electroconductive metal oxide having an electrical resistivity that is selectively matched to a noble metal coating which is applied thereon. The disclosure teaches that such an arrangement provides an interfacial electrical contact potential between the metal oxide coating and the noble metal coating which maintains a low contact electrical potential when in contact with molten glass. This low contact potential is designed to overcome the high contact potential created when molten glass seeps through minute openings in the noble metal clad refractory, thereby causing seeds or blisters to be introduced into the molten glass. The preferred method disclosed therein for coating the refractory was flame spraying both the metal oxide and the noble metal onto the refractory.

U.S. Pat. No. 2,777,254 discloses the method of coating a refractory of zirconium silicate with platinum foil which requires coating the refractory initially with a thin layer of alumina which is dusted upon the refractory surface and then applying thereto a thin platinum foil over the refractory body which is then fired to a temperature of 3030° F. A weighted refractory is used to exert pressure upon the foil during firing and is removed upon cooling. An aluminum zirconium silicate glass bond is said to result which causes adherence of the platinum to the refractory material.

I have found, however, that the platinum coating applied to grit blasted or chemically etched surfaces of hard, high density refractories have in many instances separated from the refractory upon cooling due to the inadequate roughening of the refractory surface to which the platinum coating must adhere. Neither grit blasting or chemical etching such hard dense refractories has sufficiently roughened the surface to allow an adherent mechanical bonding of the platinum to the refractory.

SUMMARY OF THE INVENTION

The object of this invention is to place an adherent coating of platinum on a hard, highly dense, refractory that can be utilized as an oxygen sensor or for contacting molten substances.

I have discovered a method of placing an adherent platinum coating on hard, dense refractories.

The method comprises cleaning the refractory surface to remove dust, grit, or organic matter; drying the cleaned refractory and thereafter plasma flame spraying thereon a refractory oxide layer of 140–200 mesh size powder and selected from the group comprising zirconia, zircon, alumina, cordierite, mullite or zirconia-alumina-silica, having a coefficient of thermal expansion which is the same as or similar to the refractory substrate and which forms an intermediate layer thereon. The intermediate oxide layer should be sufficient to give a uniform coating but thin enough to prevent spalling of the intermediate refractory oxide layer. A thickness range of 0.5 mil to 5 mils was found to be within these parameters.

The refractory coated with the oxide layer is then fired to a temperature of 1350°–1600° C. which is necessary to achieve sintering and chemical bonding of the intermediate oxide layer to the refractory.

The refractory is then plasma flame sprayed with a 20–100 micron size platinum powder and fired to between 1350°–1600° C. to densify the platinum coating.

The adherence or peel strength at room temperature of the platinum on such hard dense refractories was found to increase from a range of 0–4 lbs/in. when the platinum coating was applied directly to the refractory to 18.5 lbs/in. when an intermediate oxide layer was applied interjacent the substrate and the platinum coating.

All of the photomicrographs are of 6.5 × magnification obtained by a standard optical microscope.

DETAILED DESCRIPTION OF THE INVENTION

Figure 1:
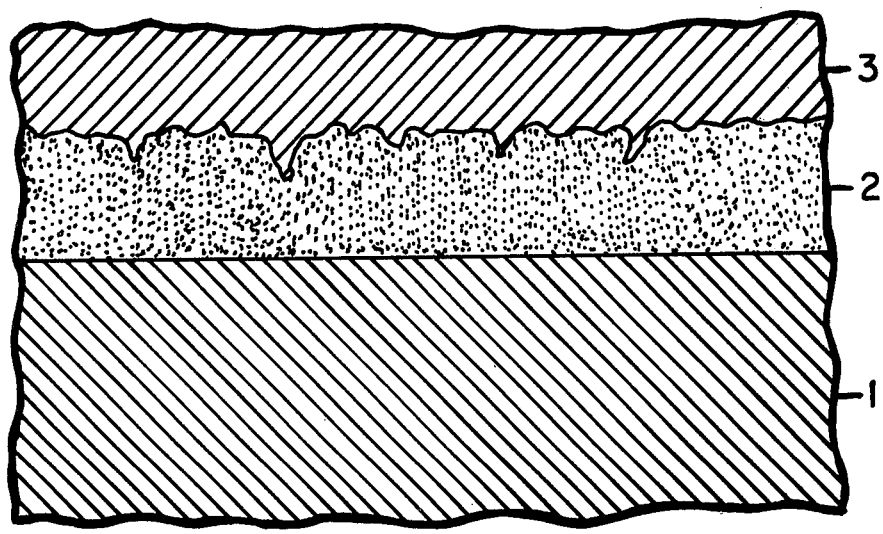
FIG. 1 is a view in cross section of a coated refractory generally illustrating coating deposition.
Figure 2A:
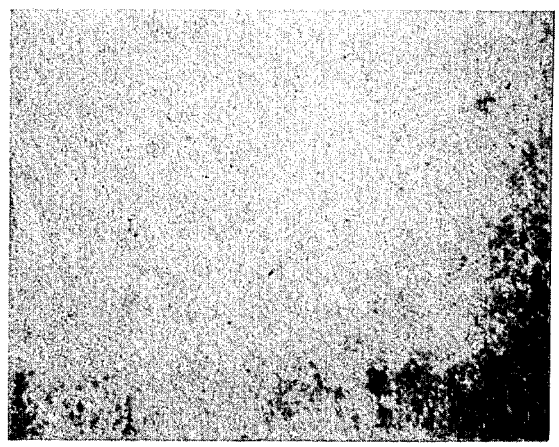
FIGS. 2(a–d) are photomicrographs of the surface of dense, hard high purity alumina refractory (a) after grit blasting with 24 mesh silica carbide grit at 80 psi, and grit blasted refractory: (b) coated with Metco 105 Al$_2$O$_3$, (c) coated with Cerac 150/325 mesh Al$_2$O$_3$ and (d) coated with Alcoa - 48 mesh tabular Al$_2$O$_3$.
Figure 2B:
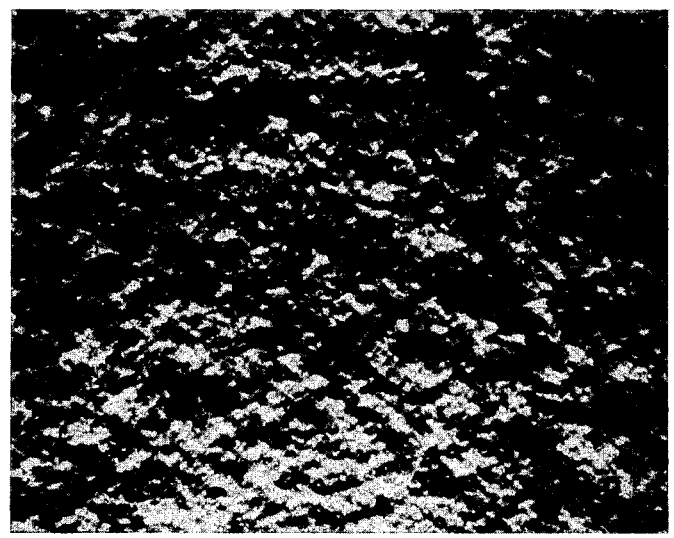
Figure 2C:
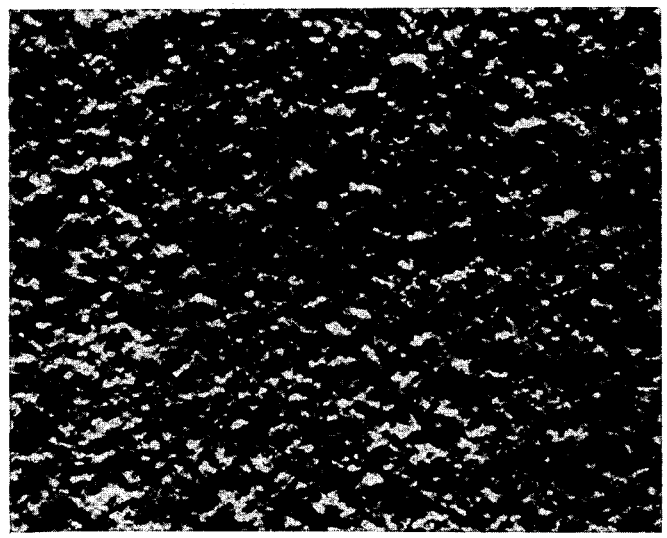
Figure 2D:
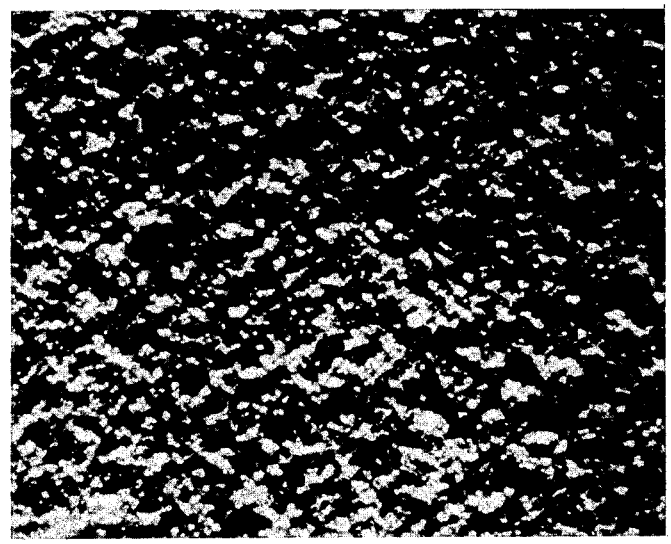

FIG. 1 shows a refractory 1 which can be a high purity alumina containing at least 97.5 wt. % alumina, or zirconia, zircon, cordierite, zirconia-alumina-silica, mullite or any other hard high density (low porosity) refractory material.

The refractory is cleaned either by grit blasting or solvent cleaning to remove any loose or powdery material, and then scrubbed and dried thoroughly in an oven prior to applying the intermediate oxide layer.

Plasma flame sprayed onto the surface of the dried refractory is an intermediate oxide layer 2, selected from the group comprised of alumina, zircon, cordierite, mullite, zirconia-alumina-silica or zirconia. The intermediate layer should preferably be of the same composition as the refractory substrate to insure a matching of the coefficient of thermal expansion.

The coefficient of thermal expansion for the selected group of hard, high density refractories are shown in Table I.

TABLE I

| | Coefficient of Thermal Expansion 25° C. -1000° C. per °C. |
|---|---|
| Alumina | 8.52 × 10$^{-6}$ |
| Cordierite | 1.0 × 10$^{-6}$ |
| Mullite (3Al$_2$O$_3$.2SiO$_2$) | 5.13 × 10$^{-6}$ |
| Zircon | 4.3 × 10$^{-6}$ |
| Zirconia-Alumina-Silica | 9.0 × 10$^{-6}$ |

TABLE I-continued

| | Coefficient of Thermal Expansion 25° C. -1000° C. per °C. |
|---|---|
| Zirconia (stabilized) | $10.0 \times 10^{-6}$ |

Chemical bonding is required between the intermediate oxide layer and the refractory to prevent a failure of the platinum coating at the interface between the refractory and the intermediate oxide layer. It was found that, for the intermediate oxide, a particle size within the range 140 to 200 mesh (Tyler) was required for the platinum coating to adhere to the intermediate refractory oxide layer. A finer oxide powder would not yield a sufficiently roughened surface due to the fact that it would generate a denser coating, and a coarser powder would not adhere to the substrate but would bounce off during flame spraying or be too coarse to sinter well to the hard surface of the refractory, even when fired to 1600° C.

The surface roughness of the intermediate oxide layer should be in the range of $300-400 \times 10^{-6}$ in.

As indicated previously, the thickness should be that necessary to give a uniform coating but sufficiently thin to avoid spalling of the intermediate layer. A coating in the range of 0.5 mil to 5 mils is recommended. A coating greater than 5-7 mils would tend to crack or spall prior to firing.

Casting voids, blisters or other flaws that are present on the refractory surface can be optionally filled either before or after the intermediate oxide coating has been applied. The filler should preferably be a paste comprised of a silicone resin or similar binder, a fine powder with a particle size of about −270 mesh and a coarser powder of about 100 mesh (Tyler Sieve Size) which are composed of the same material as the intermediate oxide layer or refractory substrate. The coarser powder acts in a manner similar to a grog in reducing the firing shrinkage of the filler.

The refractory is then fired to a temperature between 1350° C. and 1600° C. to achieve chemical bonding and sintering. Care taken in maintaining the cleanliness of the substrate after it has been coated with the intermediate oxide layer, would obviate any further cleaning prior to applying the platinum coating.

After firing, the platinum coating may be applied to the hot coated refractory surface or after it has been cooled to room temperature. The platinum coating 3 is plasma flame sprayed onto the refractory's intermediate oxide layer in a single application of approximately 5 mils thick or as a double layer—the first being applied as a thin 1 mil layer using the finest flame sprayable powder available, to which a second and coarser platinum powder is flame sprayed. The platinum powder can be obtained from wire stock and is available in a wide range of particle sizes. The advantage of the double layer is to increase the yield of useable powder and in addition the coarser powder will sinter and form a metallurgical bond with the finer powder. Adherence of the platinum to the intermediate oxide layer was found to increase as the platinum particle size decreased. The platinum powder can range in size from $20\mu$ to $100\mu$ with the preferable range being between $20\mu$ and $45\mu$.

Strong mechanical bonding of the platinum to the intermediate oxide layer is achieved by the platinum forming roots within the pores and crevices of the rough oxide layer and tenaciously adhering thereto.

Where the desired product is an impervious platinum coating for contacting molten substances, an added variation to the process can be the application of a thin platinum coating of about 3 mils by plasma flame spraying and then applying by pressure bonding a platinum sheet of suitable thickness.

The type of plasma flame spray equipment used in this invention is not critical as any suitable plasma flame spraying device is acceptable.

The plasma flame spray gun utilized for the example was Metco Type 2MC. The powder feed unit was Metco Type 3MP Dual. The power supply was Metco Type 2MR, 40KW and the spray parameters were an arc current of about 500 amps with arc voltage between 60-80 VDC. The primary gas was nitrogen at 70-100 SCFH and the secondary gas was hydrogen 15-25 SCHF. The powder carrier gas was nitrogen at 35-45 SCHF. The powder flow rate was between 2-4 lbs/hr. with the gun nozzle at a distance of 2-4 inches from the refractory surface that was sprayed.

EXAMPLE

A dense hard, high purity alumina having the composition (by weight) of 99.8% $Al_2O_3$, 0.03% $Fe_2O_3$, 0.10% $Na_2O$ and 0.07% $TiO_2$ was cut into $1\frac{1}{2}'' \times 3'' \times \frac{1}{2}''$ coupons which were treated as shown in Table II below. After grit blasting, the coupons were cleaned of grit by air blasting and plasma flame-sprayed with different types of alumina to a roughness of about $300-450 \times 10_{-6}$ inches and fired to 1600° C. for $9\frac{1}{2}$ hours. The aluminas used were Cerac 150/325 mesh $Al_2O_3$, Metco 105 mesh $Al_2O_3$ and Alcoa −48 mesh tabular $Al_2O_3$.

After firing, the blocks or coupons were washed, oven dried and plasma flame sprayed with 30-45 micron platinum powder. The coupons were then heated in air at the rate of 50° C./hr. to 1350° C. and held at 1350° C. for 10 hours then cooled at the rate of 50° C./hr. to densify the platinum coatings. The adherence of the platinum was measured by means of a 90° peel test performed at room temperature. Table I lists those results.

TABLE II

| Sample | Blasting Treatment | | $Al_2O_3$ Coating | Pull Strength lbs/in |
|---|---|---|---|---|
| | Grit (Tyler) | Pressure (psi) | | |
| 1 | 24 | 60 | None | None |
| 2 | 24 | 80 | None | None |
| 3 | 54 | 20 | None | None |
| 4 | 54 | 60 | None | None |
| 5 | 54 | 80 | None | None |
| 6 | 24 | 80 | Cerac $Al_2O_3$ | >4 |
| 7 | 24 | 80 | Cerac $Al_2O_3$ | 3-5 |
| 8 | 24 | 80 | Metco 105 $Al_2O_3$ | 18±1.0 |
| 9 | 24 | 80 | Metco 105 $Al_2O_3$ | 14±0.5 |
| 10 | 24 | 80 | Alcoa-48 mesh tab $Al_2O_3$ | 18±0.5 |

TABLE II-continued

| Sample | Blasting Treatment | | Al₂O₃ Coating | Pull Strength lbs/in |
|---|---|---|---|---|
| | Grit (Tyler) | Pressure (psi) | | |
| 11 | None | None | Alcoa-48 mesh tab $Al_2O_3$ | 18.5±1.0 |

The peel test was performed by using an Instron Tensile machine in which the length of the pull rod was 28" relative to the length of the platinum to be pulled 1–2" in order to minimize the deviation from 90°. The pull speed was 0.02 in/min. It was found that for a platinum coated high purity alumina refractory the peel strength was invariant to pulling rates from 0.02 to 0.2 in/min.

In performing the test, an 8 mil platinum tab is used to peel the platinum coating from the substrate, the tab being pressure bonded to the coated surface of the refractory by contacting them such that a portion of the tab extends beyond the platinum coated refractory surface. The coated refractory with the contacting tab is fired for 10 hours at 1350° C. under alumina weights and thereafter cooled to room temperature. After cooling the extended portion (free end) of the tab is connected to the pull rod, which is then pulled to lift the platinum such that it forms an angle of 90° with the coated surface.

This test has a limited accuracy of 35 lbs/in. at which point the platinum coating would fail at room temperature. This limit is due to the fact that a 5 mil thick sheet of high purity alumina would plastically deform under a tensile load of 35 lbs. at room temperature.

We claim:

1. The method of applying an adherent coat of platinum to hard, dense refractory which process comprises
   cleaning a surface of the refractory,
   plasma flame spraying the cleaned surface of the refractory with a refractory oxide powder selected from the group comprised of zirconia, zircon, alumina, cordierite, mullite or zirconia-alumina-silica of a 140–200 mesh particle size to form an intermediate refractory oxide coating layer thereon,
   firing the coated refractory to achieve chemical bonding and sintering of the intermediate layer to the refractory thereby resulting in that layer being rough with pores and crevices therein,
   plasma flame spraying the intermediate coated refractory with platinum powder to form a platinum coating thereon,
   heating the platinum coated refractory to densify the platinum.

2. The method of claim 1 wherein the refractory and the intermediate oxide layer is preferably selected from the group comprising zirconia, zircon, alumina, cordierite, mullite or zirconia-alumina-silica.

3. The method of claim 2 wherein the refractory and the intermediate oxide layer are composed of the same refractory material.

4. The method of claim 1 wherein the refractory and the intermediate refractory oxide layer have the same or similar coefficient of thermal expansion.

5. The method of claim 1 wherein the thickness of the intermediate refractory oxide layer is within the range of 0.5 to 5 mils.

6. The method of claim 1 wherein the refractory coated with the intermediate oxide layer is fired to between 1350° C. and 1600° C. to achieve sintering and chemical bonding of the intermediate oxide layer to the refractory.

7. The method of claim 1 wherein the platinum powder particle size is between 20–100 microns.

8. The method of claim 1 wherein the preferred platinum particle size is between 20–45 microns.

9. The method of claim 1 wherein the platinum coated refractory is heated to between 1350° C. and 1600° C. to densify the platinum coating.

* * * * *

UNITED STATES PATENT AND TRADEMARK OFFICE
CERTIFICATE OF CORRECTION

PATENT NO. : 4,159,353
DATED : June 26, 1979
INVENTOR(S) : Lee M. Adelsberg and Robert Dejaiffe It is certified that error appears in the above-identified patent and that said Letters Patent are hereby corrected as shown below:

Column 4, line 42, change "300-450x10$_{-6}$" to --300-450x10$^{-6}$--.
Table II, Column 4, line 10 under Pull Strength lbs./in for sample 7 change "3-5" to --2-5--.

Signed and Sealed this

Twenty-second Day of April 1980

[SEAL]

Attest:

SIDNEY A. DIAMOND

Attesting Officer     Commissioner of Patents and Trademarks